(No Model.) 3 Sheets—Sheet 1.
C. L. TRAVIS.
BICYCLE OR LIKE VEHICLE.
No. 564,319. Patented July 21, 1896.
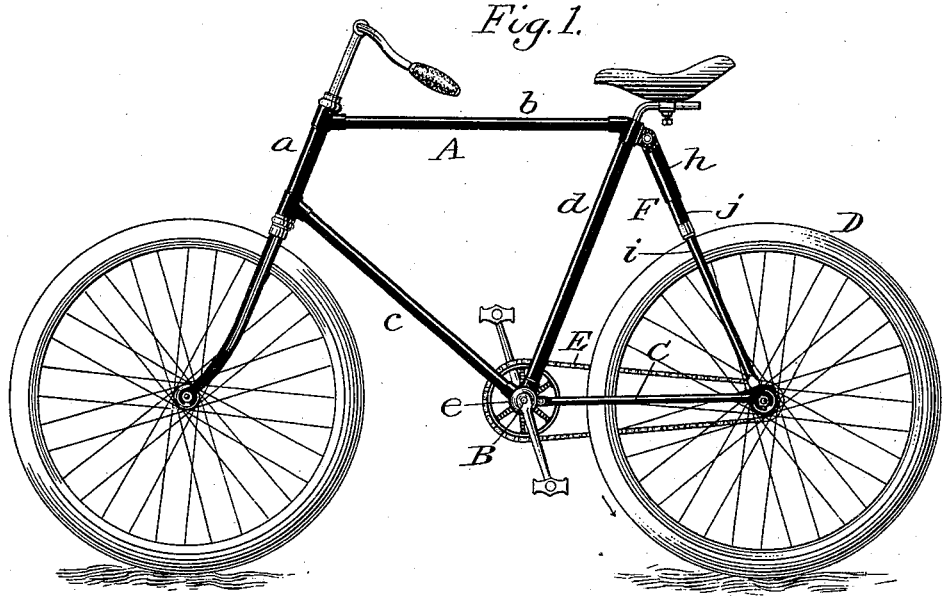
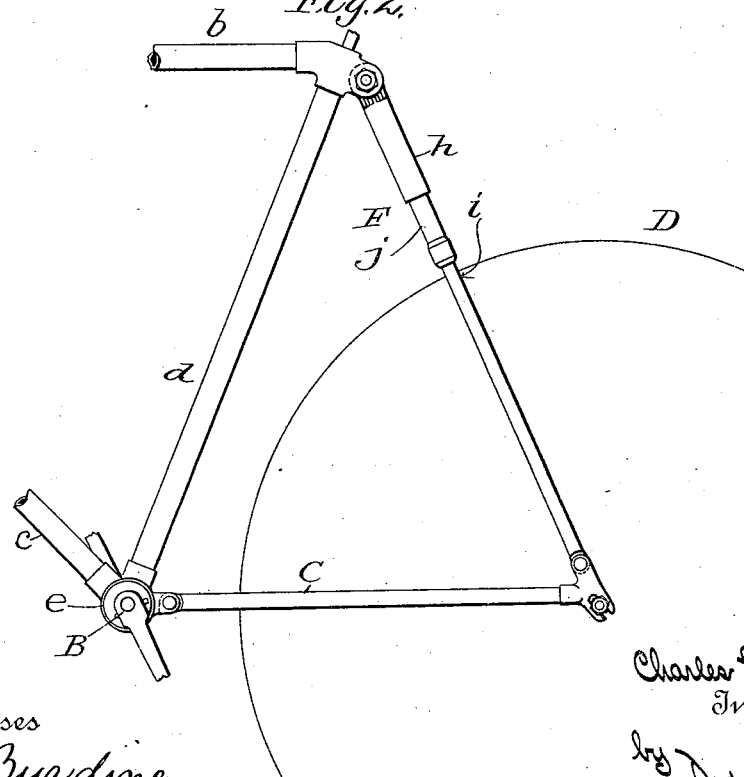
Witnesses
C. C. Burdine
C. B. Bull
Charles L. Travis,
Inventor:
by Dodge Sons,
Attorneys

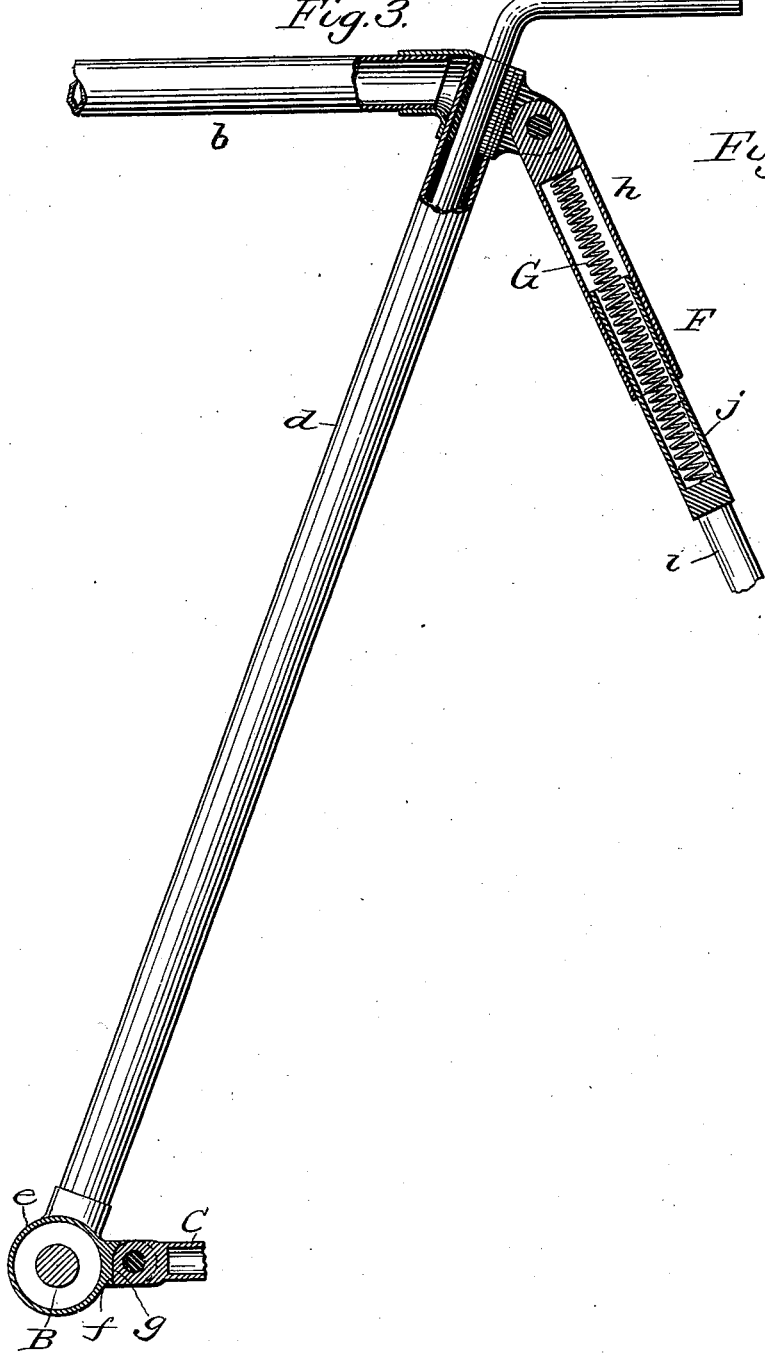
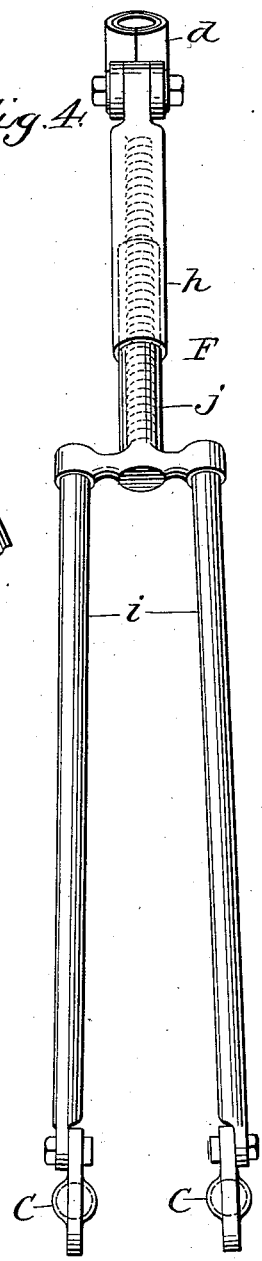

(No Model.) 3 Sheets—Sheet 3.

C. L. TRAVIS.
BICYCLE OR LIKE VEHICLE.

No. 564,319. Patented July 21, 1896.

Witnesses
C. C. Burdice
C. B. Bull

C. L. Travis
Inventor
by Dodge Sons
Attorneys

UNITED STATES PATENT OFFICE.

CHARLES L. TRAVIS, OF MINNEAPOLIS, MINNESOTA, ASSIGNOR TO THE HYGIENIC WHEEL COMPANY, OF PHILADELPHIA, PENNSYLVANIA.

BICYCLE OR LIKE VEHICLE.

SPECIFICATION forming part of Letters Patent No. 564,319, dated July 21, 1896.

Application filed November 2, 1895. Serial No. 567,743. (No model.) Patented in England December 21, 1895, No. 24,533; in Belgium December 21, 1895, No. 118,981; in Italy December 31, 1895, XXX, 40,406, and LXIX, 182; in Hungary January 14, 1896, No. 5,201; in Spain March 14, 1896, No. 18,447, and in Austria April 2, 1896, No. 46/1,336.

*To all whom it may concern:*

Be it known that I, CHARLES L. TRAVIS, a citizen of the United States, residing at Minneapolis, in the county of Hennepin and State of Minnesota, have invented certain new and useful Improvements in Bicycles or Like Vehicles, (for which I have received Letters Patent as follows: in England, No. 24,533, dated December 21, 1895; in Austria, No. 46/1,336, dated April 2, 1896; in Italy, XXX, 40,406, LXIX, 182, dated December 31, 1895; in Spain, No. 18,447, dated March 14, 1896; in Hungary, No. 5,201, dated January 14, 1896, and in Belgium, No. 118,981, dated December 21, 1895,) of which the following is a specification.

My invention pertains to bicycles and like vehicles, and particularly to such as are jointed and provided with a spring member to take up the jar and concussion occasioned by obstructions and irregularities in the roadway or surface over which the vehicles move.

The invention consists in a novel construction, hereinafter pointed out in detail, whereby a peculiarly simple, strong, and neat frame is produced in which the feature of yielding to obstructions is availed of to great advantage, and the frame is freed from the vibration and strains incident to the ordinary rigid-frame construction.

Figure 5:
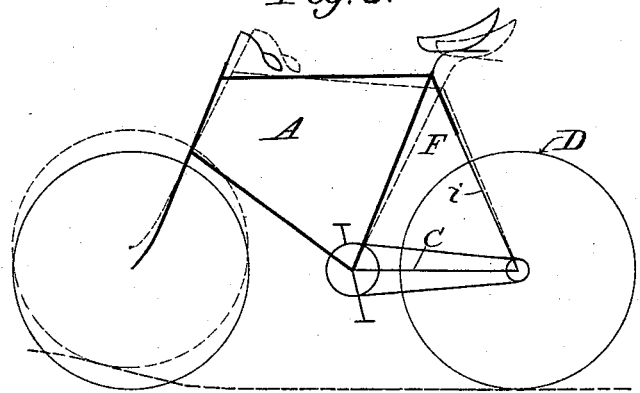
Figure 6:
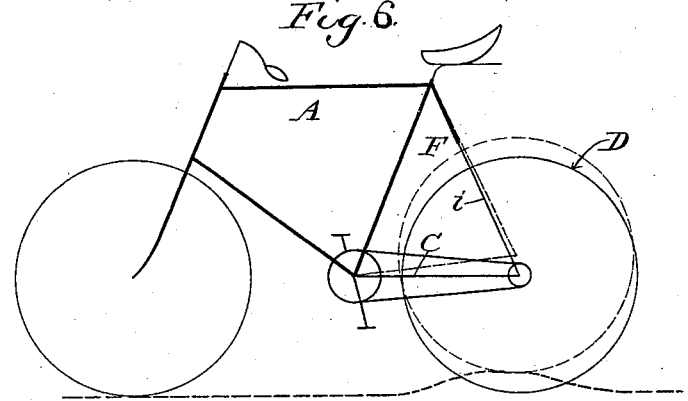
Figure 7:
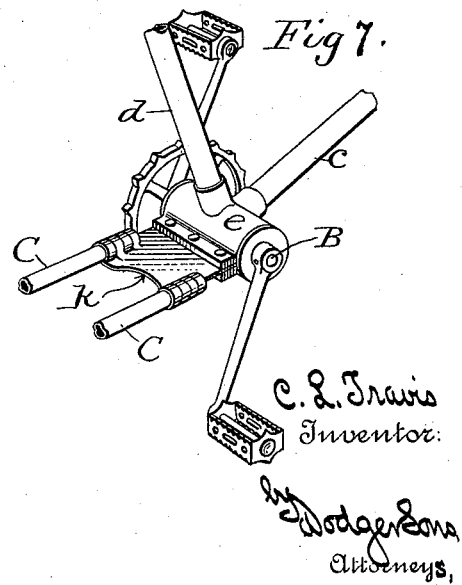

In the accompanying drawings, Figure 1 is a side elevation of a bicycle embodying my improvements; Fig. 2, a somewhat larger elevation of the rear portion of the frame; Fig. 3, a sectional view of the same; Fig. 4, a rear elevation of the contractible brace in its preferred form; Figs. 5 and 6, diagrammatic views illustrating the action of the device; Fig. 7, a modification, and Figs. 8, 9, and 10 views of different forms of spring.

It is of course well understood that if a vehicle-frame be made rigid and unyielding it must move bodily upward and downward to the extent of the elevation or depression of each and every portion of the roadway traversed, and in consequence of the momentum acquired the upward movement will ordinarily be more or less in excess of the actual elevation. Such sudden movement of the vehicle and the load upon it brings upon the frame a great and severe strain and subjects the rider to a jolting and pounding that is exceedingly unpleasant and oftentimes quite harmful. To obviate this difficulty, spring-supported saddles have been proposed, with a view to permitting the machine to rise and fall without transmitting an equal movement to the rider. So, too, springs have been introduced into the frame at various points and in different forms, with a view to enabling one portion or another of the frame to yield without necessitating bodily movement of the entire machine. These contrivances as heretofore embodied have so far failed to meet the difficulty that pneumatic tires have come into almost universal use, the yielding frames being quite generally discarded when such tires are adopted.

By careful study of the subject I have ascertained that it is practicable so to construct the frame and to supply the spring or springs that without noticeably increasing its weight or appreciably modifying its appearance the frame shall be relieved of all severe shock, concussion, or vibration, and the rider shall be free from the jolting and pounding heretofore experienced.

In practice I prefer to employ pneumatic tires, though this is not essential, and an extremely easy-riding vehicle may be produced without them.

While primarily designed for bicycles the invention may be embodied in tricycles and similar vehicles, and the details may be somewhat varied, though certain features hereinafter described should be retained.

Referring now to the drawings, A indicates the front section of a "diamond" frame, such as is quite generally adopted by leading manufacturers at the present time. This section comprises a head $a$, an upper bar $b$, a lower bar $c$, and a saddle-post standard $d$, at the lower end of which latter is located the barrel or shell $e$, in which the pedal-shaft B is carried.

Flexibly connected with the barrel $e$ of the frame-section A is a rear-wheel fork C, comprising two rods or tubes, which may be connected at their forward ends or separate, as preferred.

The manner of jointing or connecting the fork C with the barrel e may be varied, or the connection may be made to some other portion of frame-section A, provided it be close to the barrel e. In practice it is advisable that the joint be made so that the flexure shall occur close to and preferably just in rear of the pedal-shaft, in order that there shall be no appreciable variation in distance between the axis of the pedal-shaft and that of the rear wheel carried by the fork within any movement of the fork that can actually occur in the use of the machine.

A simple and quite satisfactory connection is the hinge-joint represented in Fig. 3, which permits a limited vertical play of the rear fork, but which, by engagement of the locking-faces $f$ and $g$, precludes the falling of the fork below a certain level relatively to other parts of the frame.

D indicates the rear wheel, the axle of which is carried in the rear end of fork C, as usual. Said wheel will be provided with a sprocket-wheel and driven by a chain E from a sprocket-wheel on the pedal-shaft, or in any other usual way.

At the upper end of the saddle-post standard $d$ there is pivotally or flexibly secured the closed upper end of a tubular shell $h$, constituting one member of a telescopic or two-part brace F, the other member of which comprises a fork $i$ to straddle the rear wheel, and a tubular extension $j$, closely fitting and telescoping with the shell $h$. The lower end of tubular extension $j$ is closed, as shown in Fig. 3, and within it is placed the lower end of a strong spiral spring G, the upper end of which extends into shell $h$ and bears against the closed upper end thereof.

With the ordinary diamond frame as now in use the shell $h$ and the extension $j$ may each be conveniently made in the neighborhood of six inches in length and normally telescoped to the extent of about three inches, leaving room for further telescoping of about three inches more; but these proportions may be varied to any extent desired. They are mentioned merely to show the abundant space afforded for a spring, which would thus be normally about six inches in length, allowing, approximately, three inches for compression.

The spring G will be made sufficiently stiff and strong to support the weight of the rider, with due allowance or excess for momentum, this being a matter of calculation and to some extent of individual preference.

The lower ends of the arms of fork $i$ are hinged, jointed, or flexibly connected to the rear ends of the side bars of fork C, as shown in Figs. 1, 2, and 3, the precise construction of the joint being immaterial, and provision for slight play or flexure being all that is required at either end of the brace F. These joints or connections, as also that between the front frame-section A and the rear-wheel fork C, may be made by the introduction of a flexible plate $k$ of steel or other suitable material between them, as in Fig. 9. The mode of securing the plate to the parts connected by it is unimportant, brazing, riveting, and welding being all available.

Figures 8, 9, 10:
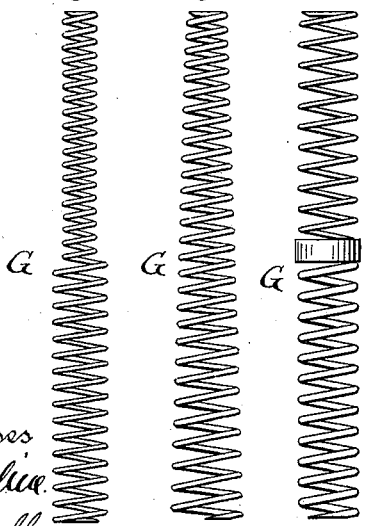

Referring now to Figs. 7 and 8, the action of the frame and spring will be explained. When the rider is seated upon the saddle, the front end of frame-section A is supported upon the axle of the front wheel, and the rear end of fork C is supported upon the axle of the rear wheel D. If the weight of the rider is greater than the resistance of the spring at its normal length, the spring will be compressed proportionately, though it is contemplated that there shall be no material compression when the machine is stationary, or when traveling over a level surface. If, now, the front wheel encounter an obstruction or elevation, it will rise, as indicated by dotted lines in Fig. 5, moving about the axis of the pedal-shaft as a center and causing the rider's seat to recede slightly, with no appreciable change in elevation. Owing to the distance between the bearing-point of the front wheel and the pedal-shaft and to the location of the rider's seat over or slightly in rear of said shaft, the front wheel can rise with relatively little resistance, the spring G being compressed and permitting such movement. As soon as the obstruction or elevation is passed the spring restores the parts to their normal positions. If the rear wheel encounter an obstruction or elevation, it will rise, the fork C swinging upward from the point of connection with front frame-section A, while the rider's inertia causes him to maintain a practically-fixed position as to height, the action being as indicated by dotted lines in Fig. 6.

It is desirable to provide for a limited yielding of the frame when slight irregularities of surface are encountered, and for additional play when greater irregularities are met with, and also to adapt the same machine, without change, to light and heavy riders. This I attain by employing a spring or springs having different portions of unequal strength or stiffness, varying the arrangement as circumstances require or convenience suggests.

In Fig. 8 I have shown a spring of one continuous wire, having its coils of different diameter in different portions of its length, and consequently capable of yielding more readily in the portion of larger diameter than in the smaller portion. In Fig. 9 I have shown a spring of gradually-increasing diameter, produced by coiling about a taper-mandrel. In Fig. 10 I have shown two sections of spring of unequal stiffness arranged end to end. Under each of these plans the weaker portion will yield until its coils are in contact, and then the heavier part will begin to yield, and thus both the above-recited objects will be attained without any attention or action on the part of the rider. This is an extremely important provision, and one which goes far to remove one of the most serious objections heretofore obtaining against jointed bicycle-frames with take-up springs.

It is particularly to be observed that the spring is entirely concealed; that it is compressed in the direction of its axis and consequently has no tendency to buckle laterally or exert a side strain upon the brace; that if the spring should break or set the machine would still be entirely serviceable; that the double thickness produced by the shell $h$ and extension $j$ gives great strength to resist lateral strains to which the rear fork is subjected, and that all parts of the telescopic brace are kept at all times below the upper member of the front frame. Hence they cannot in any manner interfere with the saddle-post or with the rider.

It will also be noted that the rear fork and the brace may, under this construction, be made of usual lightness, since there is no lateral strain applied to the brace and transmitted through the rear fork to the front frame, as is the case where the rear frame is made in the form of an elbow-lever and a spring is arranged to act against the upper arm of said lever.

The improvement may be readily and cheaply applied to machines now in use, as has in fact been done by me with perfect success.

Having thus described my invention, what I claim is—

1. In combination with a rigid front frame, a rear-wheel fork flexibly connected therewith at or near the pedal-shaft bearing; a tubular shell flexibly connected at its upper end to the upper rear portion of the front frame; a forked brace flexibly connected to the rear portion of the rear-wheel fork, and provided at its upper end with a tube adapted to telescope with the tubular shell; and a coiled spring having one end seated in the tubular shell and the other end seated in the tubular extension of the forked brace, substantially as shown and described, whereby the use of a long and elastic spring is permitted.

2. In a bicycle or like vehicle, the combination of a rigid front frame carrying a rider's-seat support and a pedal-shaft bearing; a rear-wheel fork flexibly connected with said front frame at or near the pedal-shaft bearing; a forked brace flexibly connected with the rear portion of the rear-wheel fork; and a yielding or elastic member interposed between the circumference of the rear wheel and the rear portion of the front frame, and consisting of a tubular extension of the forked brace and a tubular shell flexibly connected with the front frame, telescoping one within the other, and a spring having its ends seated in the respective tubular shells.

3. In a bicycle or like vehicle, the combination of a rigid front frame carrying a rider's-seat support and a pedal-shaft bearing; a rear-wheel fork; a lock-joint connecting the rear-wheel fork with the front frame at or near the pedal-shaft bearing; a forked brace flexibly connected with the rear portion of the rear-wheel fork; and a yielding or elastic member interposed between the circumference of the rear wheel and the rear portion of the front frame, and consisting of a tubular extension of the forked brace and a tubular shell flexibly connected with the front frame, telescoping one within the other; and a spring having its ends seated in the respective tubular shells.

4. In a bicycle or like vehicle, the combination of a rigid front frame A, provided with pedal-shaft bearing $e$, shaft B, and rider's-seat support $d$; rear fork C hinged to frame A at or near bearing $e$; rear brace F comprising the tubular member $h$ jointed to the upper rear portion of the main frame A, member $i$ jointed to rear fork B, and tubular extension $j$ arranged to telescope with the member $h$; and spring G bearing at its ends against the telescopic members $h$ and $j$ respectively and tending to hold them apart, substantially as set forth.

In witness whereof I hereunto set my hand in the presence of two witnesses.

CHARLES L. TRAVIS.

Witnesses:
 WILLIAM W. DODGE,
 HORACE A. DODGE.